(No Model.)  2 Sheets—Sheet 1.
M. L. RITCHIE.
DIE OR SWAGE.
No. 279,020.  Patented June 5, 1883.
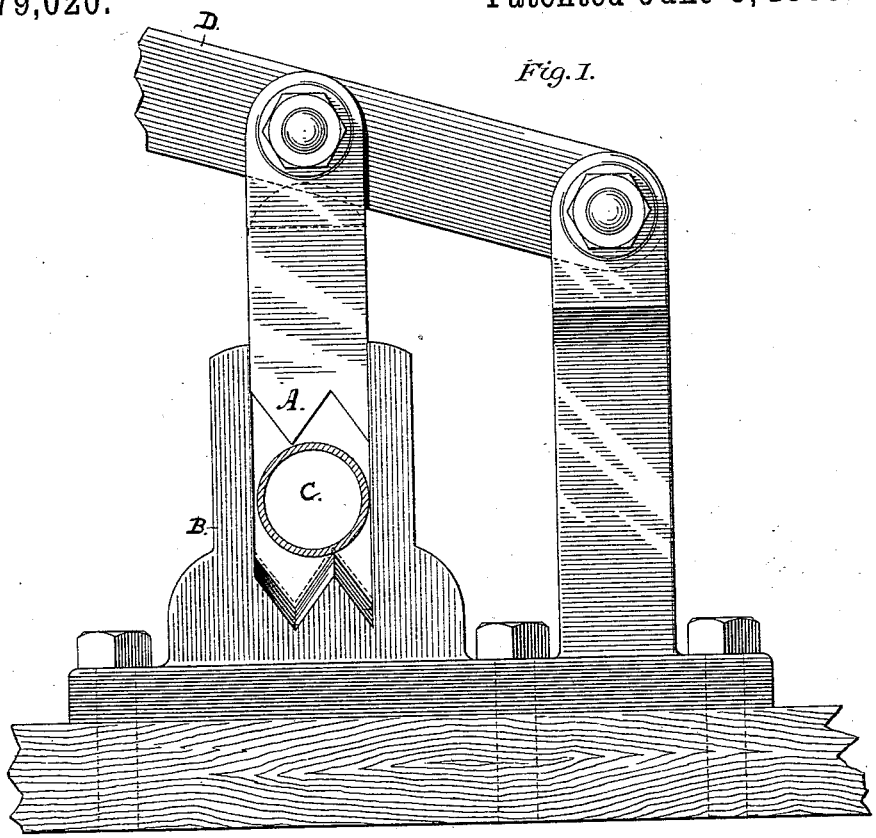
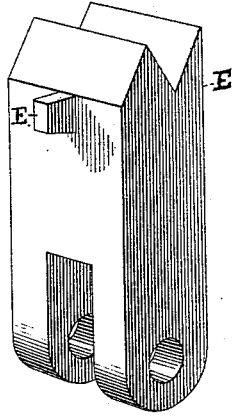
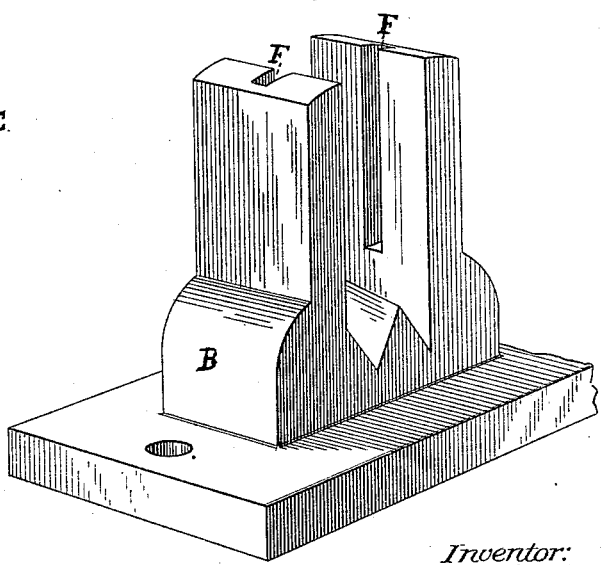
Attest:
Raymond F. O. Barnes.
G. S. P. Stillman
Inventor:
Matthew L. Ritchie
per Sam'l Campbell
Attorney (No Model.) 2 Sheets—Sheet 2.
M. L. RITCHIE.
DIE OR SWAGE.
No. 279,020. Patented June 5, 1883.
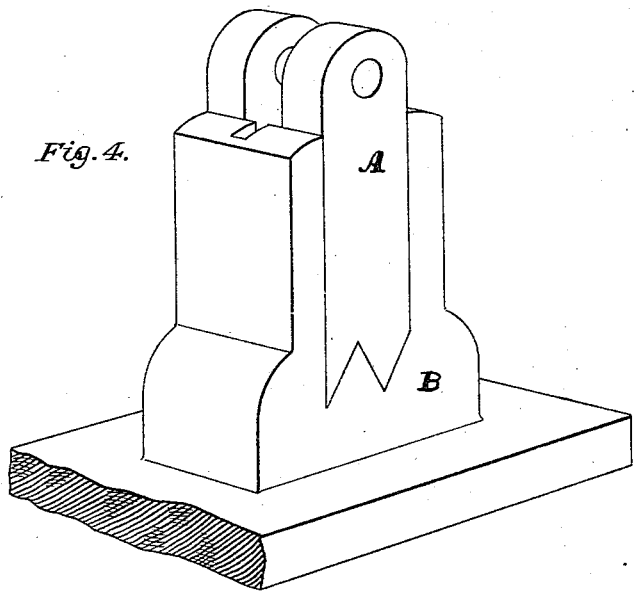
Fig. 4.
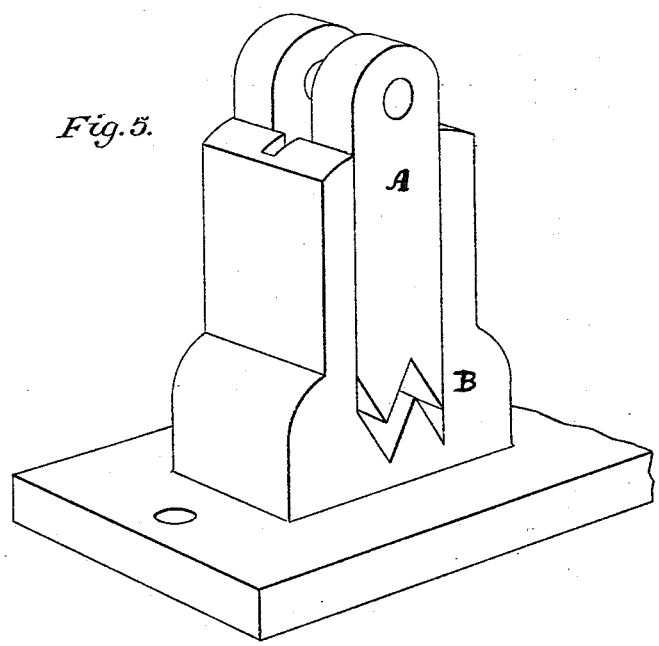
Fig. 5.
Fig. 6.
Attest:
Raymond F. Barnes.
G. S. P. Stillman.
Inventor:
Matthew L. Ritchie
per
Samuel Campbell
Attorney
N. PETERS, Photo-Lithographer, Washington, D. C.

UNITED STATES PATENT OFFICE.

MATTHEW L. RITCHIE, OF NEW YORK, N. Y.

DIE OR SWAGE.

SPECIFICATION forming part of Letters Patent No. 279,020, dated June 5, 1883.

Application filed October 20, 1882. (No model.)

*To all whom it may concern:*

Be it known that I, MATTHEW L. RITCHIE, of city, county, and State of New York, have invented a die or swage for forming a solid nose or tip on end of tubes, of which the following is a specification.

Before passing tubes through the process known as "redrawing," it is necessary to make one end solid to be grasped by the tongs or hooks, which is now accomplished by welding a shank or porter to one end of tube, to do which necessitates the employment of skilled labor, and consumes much material, and is a slow and expensive mode, whereas by means of the swage or die hereinafter described, which can be used under a pressure of ordinary lever or other power in hands of any person, I am enabled to form with great rapidity and at small expense the end of a tube into a Z shape, which, compressed, gives a solid end of six thicknesses of suitable shape and sufficient strength for purpose mentioned.

In the accompanying drawings, Figure 1 represents a view of the swage or die open, with tube C placed in position for swaging, consisting of two parts, A and B. A represents the acting or male portion thereof, operated by the lever D for compressing the ends of the pipe preparatory to the operation of drawing. B represents the stationary corresponding part of the swage or die, similar letters referring to similar parts. The dotted lines represent the swage or die closed.

Fig. 2 represents a side view of the male portion A, disconnected from B, inverted, showing the inner conformation of the die, having guides E E placed one on each side to fit into slots or grooves F F in inner perpendicular surface of stationary portion B, (shown in Fig. 3,) for purpose of steadying part A when in operation. The two corresponding parts of the die or swage are so formed that when they are placed in contact there will be considerable space between the upper and lower portions of the die or swage on the front side, as shown in Fig. 5, while they will fit closely on the rear side, as shown in Fig. 4, thus preventing all danger of die or swage cutting off end of tube, as it might otherwise do, and at same time giving a tapering form to the end of pipe or article swaged.

Fig. 6 represents a view of the tube after having been swaged, showing a Z-shaped tapering end, which can be instantly compressed by a single blow into a solid nose or tip, thereby avoiding the necessity for welding on of a shank or porter.

Having thus described my invention, what I claim, and desire to secure by Letters Patent, is—

A Z-shaped die or swage consisting of two parts, A and B, A being the acting or male, B the corresponding stationary or female portion, for compressing the ends of tubes into six thicknesses, thereby forming a solid Z-shaped nose or tip suitable for grasping with tongs, as a substitute for the welded shank or porter now used, substantially as herein set forth.

In testimony that I claim the above I have hereunto subscribed my name in the presence of two witnesses.

MATTHEW L. RITCHIE.

Witnesses:
 O. A. WHIPPLE,
 HOWARD CAMPBELL.